United States Patent
Linke et al.

[11] Patent Number: 6,101,009
[45] Date of Patent: Aug. 8, 2000

[54] HOLOGRAPHIC DATA STORAGE AND/OR RETRIEVAL APPARATUS HAVING A SPHERICAL RECORDING MEDIUM

[75] Inventors: Richard A. Linke; Ian R. Redmond, both of Princeton, N.J.

[73] Assignee: NEC Research Institute, Inc., Princeton, N.J.

[21] Appl. No.: 09/162,099

[22] Filed: Sep. 28, 1998

[51] Int. Cl.[7] .............................. G03H 1/26; G03H 1/02
[52] U.S. Cl. ................................ 359/22; 359/3; 359/8; 359/30
[58] Field of Search .................. 359/22, 8, 7, 10, 359/3, 21, 30, 11; 430/1, 2

[56] References Cited

U.S. PATENT DOCUMENTS

| | | |
|---|---|---|
| 4,017,144 | 4/1977 | Staebler . |
| 4,022,618 | 5/1977 | Bartolini et al. ................ 350/3.61 |
| 5,111,445 | 5/1992 | Psaltis et al. . |
| 5,319,629 | 6/1994 | Henshaw et al. . |
| 5,436,867 | 7/1995 | Mok . |
| 5,550,779 | 8/1996 | Burr et al. . |
| 5,887,090 | 3/1999 | Rudolph et al. ................ 385/24 |

FOREIGN PATENT DOCUMENTS 0002251  1/1980  Japan .............................. 359/3

OTHER PUBLICATIONS

R.A. Linke, et al., "Holographic Storage Media Based on Optically Active Bistable Defects", J. Appl. Phys. 83(2), pp. 661–672, Jan. 1998.

Feng Zhao, et al., "Compact Read–Only Memory with Lensless Phase–Conjugate Holograms", Optics Letters, vol. 21, No. 16, pp. 1295–1297, Aug. 1996.

P.J. van Heerden, "Theory of Optical Information Storage in Solids", Applied Optics, vol. 1, No. 4, pp. 393–400, Apr. 1963.

*Primary Examiner*—Cassandra Spyrou
*Assistant Examiner*—Fayez Assaf
*Attorney, Agent, or Firm*—Scully, Scott Murphy & Presser

[57] ABSTRACT

A holographic data storage and/or retrieval apparatus having a spherical holographic recording medium and addressing means for rotating the recording medium to selectively expose the recording medium to data and reference beams at predetermined rotational positions. Whereby image data contained in the data beam is recorded in the recording medium and/or a data beam containing image data is reconstructed from the recording medium.

36 Claims, 3 Drawing Sheets

HOLOGRAPHIC DATA STORAGE AND/OR RETRIEVAL APPARATUS HAVING A SPHERICAL RECORDING MEDIUM

BACKGROUND OF THE INVENTION

1. Field of the Invention

The field of art to which this invention relates is optical data storage. Specifically, this invention relates to optical data storage based on holographic recording within a rotatable spherical medium, preferably contained within a fluid.

2. Description of the Related Art

The inherent theoretical capacity of a holographic storage medium in bits is $V/\lambda^3$ (according to a calculation by P. J. Van Heerden (1963) *Appl. Opt.* 2 (4): 393), where V is the volume of holographic material and $\lambda$ is the wavelength of light inside the material. This leads to very high potential capacities and is a major reason for the interest in holographic storage. For example, a 1 inch cube with a refractive index of 1.5 has a theoretical capacity of $4.4 \times 10^{14}$ bits at 500 nm wavelength, or 55 terabytes. In order to approach this value in practice, page sizes should be as large as possible (in the range of $10^6$ to $10^8$ bits), and the maximum number of pages should be stored that the medium can support. Since a page is written and read out in parallel, data rates are also inherently high and typically limited by the speed at which data can be loaded onto the page-composing device (during writing) or down-loaded from a camera (during readout). For example, a page size of $4 \times 10^7$ bits need only be read out once every second to be comparable to existing magnetic hard disk readout rates of 5 MB/s.

Typically the holographic medium in previously described holographic storage systems is formed in the shape of a cube or cuboid, which is fixed in position. Also, the optical beam bearing the data image is typically incident from a fixed direction. A single hologram is recorded by allowing an image beam containing a two-dimensional "page" of data to be incident on the medium simultaneously with a simple "reference" beam derived from the same source, but incident at a different angle. The two beams form a stationary optical interference pattern, which is recorded by the holographic medium in the form of a refractive index image which follows the interference pattern. Reconstruction of the data image is achieved by illuminating the holographic medium with a single beam identical to the reference beam, causing bragg diffraction to reproduce the original data image beam.

Illumination with a beam identical to the reference beam in every respect except its direction results in negligible reconstruction of that data page. The angular range of the reference beam directions around that of the original which may be used and still cause readout of only the single desired data page is a function of the physical parameters of the systems, but notably of the angle between the reference and data image beams. This angular proximity is referred to as the "angular bragg width." This angular selectivity allows recording of multiple holograms of data pages by changing the angle of incidence of the simple reference beam.

The angular multiplexing technique described above has the disadvantage that some means must be used to vary the reference beam direction, such as a galvo mirror or electro-optic or acousto-optic means. These techniques are difficult to realize in practice and have difficulty in achieving a wide range of angles. Also, since the angle between the reference and data beams changes between pages, the angular separation of holograms is not constant throughout. These features lead to a reduction in the achievable capacity of the storage system.

Use of a rotatable recording medium and fixed beams can alleviate these limiting features. A cylindrical medium is disclosed in U.S. Pat. No. 4,017,144, to Staebler. In the case of the cylinder, simple corrections in the beam aberrations are not possible in the presence of a refractive index change after recording. Pixel beams diffracted horizontally (so their axes exit the cylinder surface at normal incidence) have aberrations which are easily corrected, but pixel beams diffracted vertically (with a component along the cylinder axis) have their directions changed as they refract at the surface, causing them to land in the wrong position at the detector, and to have their best focus plane in a different position. In general, this system requires complex optics to correct aberrations.

SUMMARY OF THE INVENTION

Therefore, it is an object of the present invention to provide a holographic data storage and/or retrieval apparatus in which the deficiencies associated with angular multiplexing are eliminated.

It is yet another object of the present invention to provide a holographic data storage and/or retrieval apparatus in which pixel beams diffracted from the surface of the holographic medium are easily corrected, if necessary.

It is yet another object of the present invention to provide a holographic data storage and/or retrieval apparatus in which the achievable capacity of the storage system is maximized.

It is still yet another object of the present invention to provide a holographic data storage and/or retrieval apparatus in which the above objectives are fulfilled in a simple apparatus which requires a minimum of moving parts.

Accordingly, a holographic data storage apparatus is provided. The holographic data storage apparatus comprises a spherical holographic recording medium and addressing means for rotating the recording medium to selectively expose the recording medium to data and reference beams at predetermined rotational positions, whereby image data contained in the data beam is recorded in the recording medium at the predetermined rotational positions.

Also provided herein is a holographic data retrieval apparatus. The holographic data retrieval apparatus comprises a spherical holographic recording medium and addressing means for rotating the recording medium to selectively expose the recording medium to a reference beam whereby a data beam containing image data is reconstructed from the recording medium when addressed by the reference beam.

Furthermore, a holographic data storage and retrieval system is provided. The holographic data storage and retrieval system comprises: a spherical holographic recording medium; a light source; addressing means for rotating the recording medium to selectively expose the recording medium to data and/or reference beams; storing means for directing the reference and data beams to be incident upon the recording medium when image data contained in the data beam is to be stored in the recording medium; and data retrieval means for retrieving the stored image data from a reconstructed data beam when the recording medium is exposed to the reference beam.

Preferred embodiments of data storage and/or data retrieval systems of the present invention are provided in which the systems further comprise a container for containing the recording medium therein. The container preferably has at least one optical access window or lens for the data, reference, and reconstructed data beams to and from the container. The container preferably contains a fluid of optical transparency, such as a liquid with a refractive index substantially equal to the refractive index of the recording medium.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Figure 1:
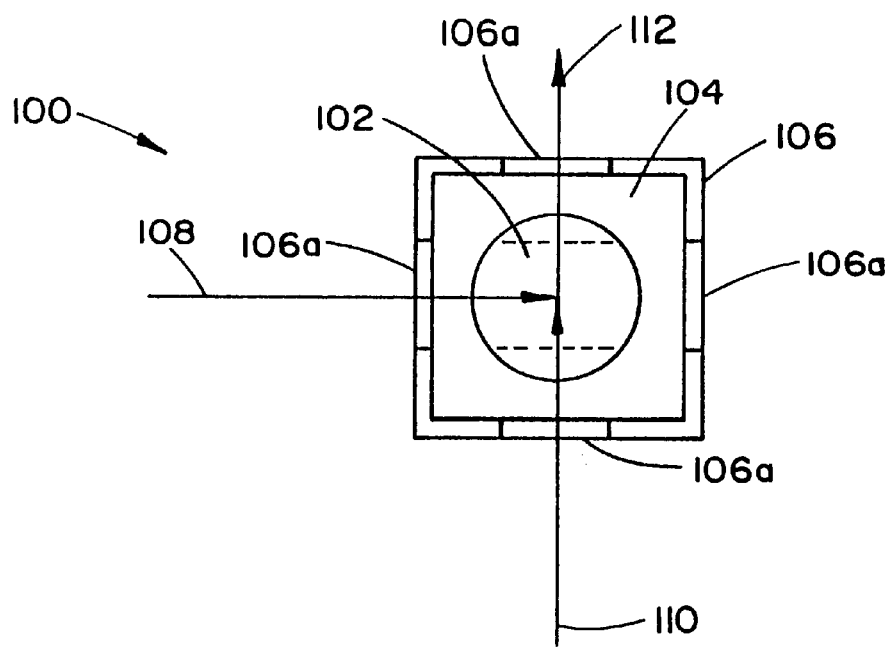
FIG. 1 is a schematic view of the holographic data storage and/or retrieval apparatus of the present invention.

Referring to FIG. 1, there is illustrated a holographic data storage and retrieval apparatus of the present invention utilizing a spherical medium having beneficial optical properties, the apparatus being generally referred to by reference numeral 100. The holographic sphere 102 is made from any type of holographic recording material known in the art, such as lithium niobate, or DX-center material or any other storage material known in the art. Preferably, the holographic sphere 102 is polished appropriately to form its spherical shape by conventional lens manufacturing techniques. However, the recording medium can also be a truncated sphere such that it is spherical in only the portions upon which data and reference beams are incident as shown by the dashed lines of FIG. 1.

The holographic sphere 102 is free to rotate within a volume of medium 104 of optical transparency, which may be air, gas, vacuum or a liquid. Preferably, medium 104 is a fluid with a refractive index very close to that of the holographic recording medium 102. The holographic recording medium 102 and surrounding medium 104 (if the medium 104 is not air) are preferably contained within a box or container 106 having optical access windows or lens 106a to allow entry and exit of reference and data page beams 108, 110, respectively, which form the holographic recordings. Preferably, reference beam 108 and data beam 110 are incident with 90° separation. However, this angle is not critical, but is preferred because it results in an optimum (smallest) angular bragg separation between holograms, and is also a geometry which minimizes the effect of material optical scatter.

Multiple holograms are recorded by simply rotating the holographic sphere 102 within its surrounding medium 104 and container 106 by a required amount (i.e., by at least the angular bragg width). Further recordings are made at differing rotational positions of the spherical recording medium 102. This rotation is achieved by any addressing means (not shown) known in the art which does so with a high degree of repeatability and precision, such as a stepper motor system. The use of the rotating spherical recording medium 102 allows a full 360° of rotation to be used, enabling the maximum number of pages to be easily recorded. The use of a spherical shape causes the performance to be insensitive to the angular orientation of the medium. This is in contrast to the conventional use of a cube in air, where reflection power losses and beam refraction at extreme incident angles cause large variations in page efficiency and quality. In addition, if the surrounding medium 104 is close in refractive index to that of the spherical recording medium 102, then reflection power losses at the spherical recording medium 102 become negligible.

Reconstruction of a desired page involves rotating the spherical recording medium 102 by means of the addressing means to the appropriate angular position and illuminating with the reference beam 108 only. The data page beam is then reconstructed, 112, by diffraction and appears identically as the original did after passing through the container 106, containing the spherical recording medium 102.

The embodiment shown in FIG. 1 has the advantages of mechanical simplicity, fixed angular bragg width for every hologram (i.e., regular recording angular positions) and the ability to easily utilize the entire available angular range, and thus maximize the storage capacity of the system.

The use of a spherically shaped recording medium 102 (over other circularly symmetric shapes, such as a cylinder) is particularly relevant if there is any change in the average refractive index of the holographic medium 102 between recording and retrieval. This could happen if the material utilizes a local physical mechanism (such as DX materials, see, R. A. Linke et al. (1998) *J. Appl. Phys.* 83 (2): 661), in which case its average refractive index will change steadily as more exposures are added. It could also happen for other reasons, such as a change in temperature between recording and readout. When such a change is present, it will no longer be possible to exactly match the bragg condition required for efficient readout when a reference beam is used which is identical external to the medium to that used during recording. This is due to the change in refraction angle of light entering the medium. However, the use of a spherical medium makes it possible to approximately match the bragg condition and achieve efficient readout by addition of a compensating convergence or divergence to the reference beam. This also enables high aberration performance to be maintained and thus high storage capacity. Importantly, this can be done easily by a simple adjustment of the position of a lens in the reference beam path. In addition, this technique works best in the case where the medium is surrounded by a liquid with matching (or nearly matching) refractive index. In this case, correction can be near perfect for typical real refractive index changes (<0.01). In the case of a cylindrical medium, such a correction is not so easily possible.

It should be apparent to someone skilled in the art that the apparatus of the present invention can be either a data storage, retrieval, or a data storage and retrieval apparatus without departing from the scope or spirit of the present invention. For instance, data can be stored in spherical recording mediums 102 en mass in a production facility using only a storage apparatus according to the present invention. These recording mediums 102 can then be utilized in read only systems in which only a data retrieval system is necessary. Of course, a system capable of reading and writing data would utilize an apparatus according to the present invention which is capable of both data storage and retrieval.

Figure 2:
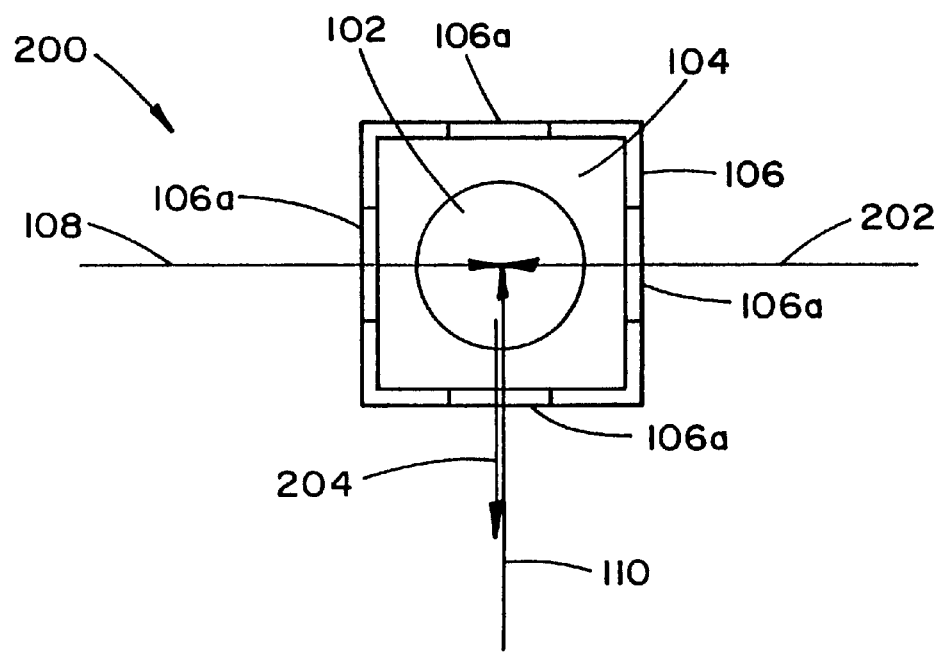
FIG. 2 is a schematic view of a variation of the holographic apparatus of the present invention utilizing a phase conjugate reference beam.

Referring now to FIG. 2, there is shown an alternative and preferred embodiment similar to that of FIG. 1, but utilizing the phase conjugation property of holograms which is important within the context of maximizing the storage capacity and readout rate of the apparatus. The apparatus generally being referred to by reference numeral 200 with like elements from FIG. 1 being referred to with like reference numerals. In the embodiment of FIG. 2, data storage is identical to the embodiment of FIG. 1. However, data retrieval is performed using a time-reversed, or phase conjugate, copy of the reference beam 108. This readout beam is denoted as 202. The reconstructed data beam 204 is also a phase-conjugate or time reversed copy of the original. This technique has the advantageous property that aberrations induced in the data beam 110 by the spherical recording medium 102, access windows or lenses 106a or other optics will be undone so long as an accurate phase conjugate beam can be produced inside the recording medium 102, allowing very large numbers of data pixels to be recorded in one page without requiring highly complex or expensive lenses to faithfully image the data pixels.

Figure 3:
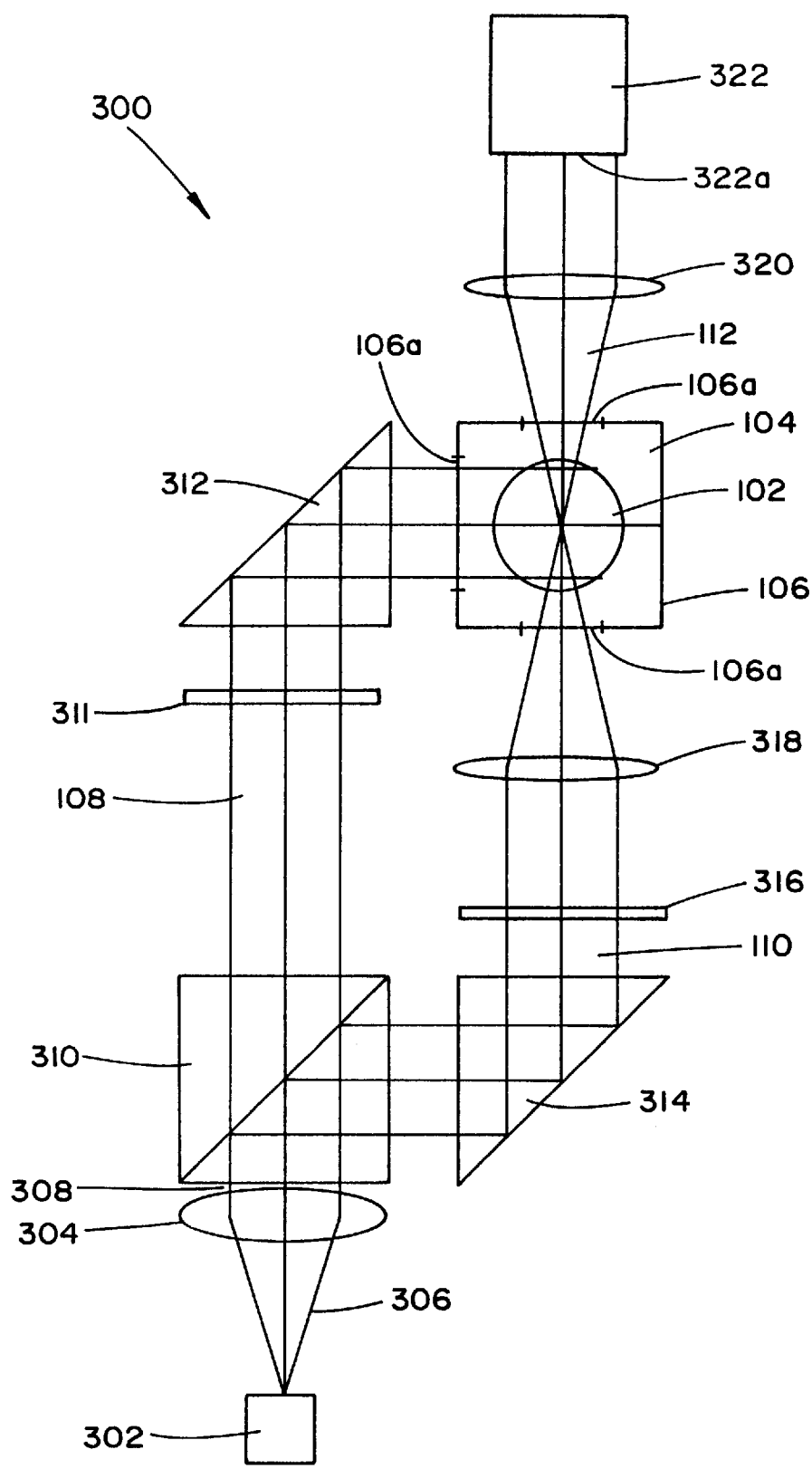
FIG. 3 is a schematic view of a preferred embodiment of the holographic data storage and retrieval system of the present invention.

Referring now to FIG. 3 there is shown a preferred embodiment of the holographic data storage and retrieval apparatus of the present invention showing the optical part of the apparatus of FIGS. 1 and 2, the apparatus being generally referred to by reference numeral 300. The apparatus 300 comprises the spherical recording medium 102 and addressing means as shown in FIGS. 1 and 2. The apparatus 300 further comprises a light source 302, preferably a laser; storing means for directing reference beam 108 and data beam 110 to be incident at selected rotational positions of the recording medium 102 when image data contained in the data beam is to be stored in the recording medium; and data retrieval means for retrieving the stored image data from a reconstructed data beam 112 when the recording medium is exposed to the reference beam 108 only.

The storing means preferably comprises a collimating lens 304 or other optics for collimating the light beam 306 from the light source 302. The collimated light 308 is split by any splitting means known in the art, but preferably by a polarization splitting means 310 which transmits the reference beam 108 having a P, or horizontal polarization and reflects the data beam 110 having an S, or vertical polarization. The polarization splitting means 310 is preferably a polarization beam splitter (PBS) cube. The reference beam 108 is converted to S polarization by a ½ waveplate 311 and redirected by a first reflecting means 312, preferably a prism or mirror, to fall onto the spherical holographic recording medium 102, optionally contained within a medium such as a fluid 104. The ½ waveplate 311 can be disposed in the optical path of the reference beam 108 anywhere between the PBS 310 and the spherical recording medium 102.

Figure 4:
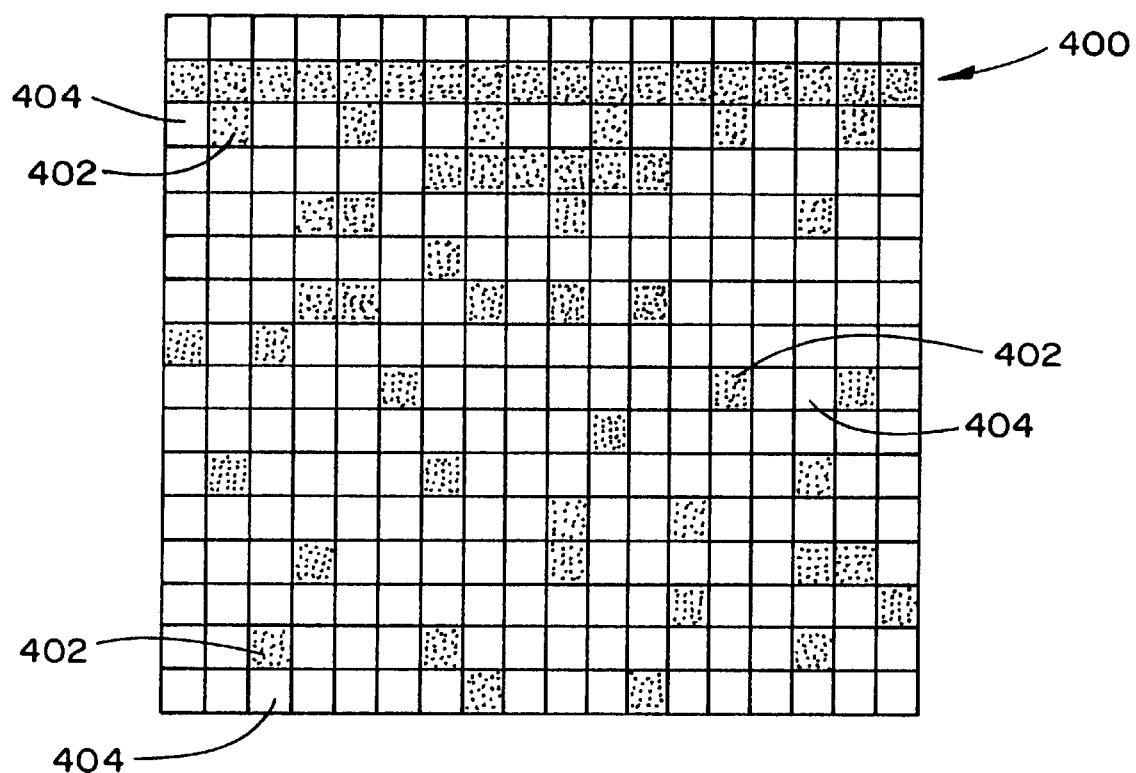
FIG. 4 is a representation of the typical image data pattern contained in an image beam in which a darkened region represents a binary "0" bit and a bright region represents a binary "1" bit.

The data beam 110 is directed by a second reflecting means 314, such as a prism or mirror to fall upon a data-composing means 316, such as a spatial light modulator. Referring to FIG. 4, the data composing means 316 imposes the 2-dimensional pattern of a data page 400 to be stored onto the amplitude of the beam. This pattern typically consists of a dark region (or "pixel") 402 representing a binary zero bit and a bright pixel 404 representing a one bit.

Referring back to FIG. 3, a focusing lens 318 forms either an image or a Fourier transform of the data page 400 within or near the spherical holographic medium 102, where it interferes with the reference beam 108 to form a holographic recording of the data page 400. The two beams (108, 110) are incident on the holographic recording medium 102 for some "exposure time," which is such that the required magnitude of change of refractive index is created. This time depends on the laser power available and the sensitivity of the holographic medium. The exposure may be either sufficiently long that the sphere must be stationary during the recording process, or it may be sufficiently short that the sphere may rotate continuously and recording "flashes" effectively freeze the motion of the sphere instantaneously. Further data pages are recorded at alternative sphere angular positions.

Preferably, apparatus 300 has a data retrieval means, to retrieve, or read out data. The data retrieval means preferably comprises a data beam blocking means which is preferably the page-composing device 316. The page-composing device 316 is turned off to block all light in its path such that the reference beam 108 only falls on the holographic recording medium 102. A reconstructed data beam 112 corresponding to the particular sphere angle is reproduced by diffraction from the stored hologram, and is imaged (or Fourier-transformed) by imaging lens 320 to create an image of the original data page 400 on a sensitive surface 322a of a camera 322. Preferably, the sensitive surface 322a of the camera 322 is a pixilated photo sensor array where one reconstructed data pixel falls onto only one camera pixel for maximum utilization of the camera 322 capacity. An electrical signal retrieved from each camera pixel is discriminated to be either a zero or a one, and the original digital data is, thus, retrieved.

Thus, due to the inventive use of a spherical holographic recording medium 102 in the apparatus of the present invention, the aforementioned objectives are met. When the image data in the form of a hologram is to be read out, the reference beam (or its phase conjugate) only is presented, and the set of pixel beams (or their phase conjugate) will be reconstructed. This only happens perfectly if the wavelength, bulk (average) refractive index and reference beam wavefront all are identical to that at recording. However, if there has been a change of bulk refractive index between recording and readout (such as in DX materials, or of there is a temperature change), readout will not be efficient, and in general will also produce aberrated pixel beams which will be larger than those recorded and therefore may overlap, and the whole image data page 400 may be distorted in shape (pixel positions wrong and missing the camera's detectors). The source of these problems can be seen by recognizing that if the refractive index has changed, then the light of the reference beam will be refracted as it enters the recording medium (at least the part that is not at normal incidence), and therefore inside the recording medium it will not match the shape of the wavefront used during recording. Such errors lead to inefficient and aberrated readout. Therefore, the present invention approximately matches the readout wavefront to the recorded one inside the medium. This enables accurate and efficient replay within the recording medium, however, further refraction of the reconstructed pixel beams 112 will then occur as they exit the recording medium. Thus, the present invention also corrects any resulting aberrations to guarantee the reconstructed pixels are clearly resolved and fall in the correct place on the sensitive surface of the camera. In the case of a spherical recording medium, there is a refractive index mismatch on entering the sphere, it's primary effect is to cause some focusing (i.e. it turns the plane wavefront of the collimated beam into a spherical wavefront, converging if the sphere has a higher refractive index, and diverging if lower). However, if the opposite convergence or divergence is added to the beam before entering the recording medium, it will become substantially planar inside, as desired, and will replay the hologram efficiently and accurately. In the case of a circular cylinder, the same argument is true, but a cylindrical curvature must be added to the beam by a circular lens. In addition, the diffracted pixel beams then refract on their exit from the medium, at which point there is a significant difference between the sphere and the cylinder. In the case of the sphere, the axis of each pixel beam exits at normal incidence to the sphere and so it's direction is unchanged by refraction, and the effect of refraction is to simply add some curvature (convergence or divergence) onto each beam. All of the beams then pass through the imaging (or Fourier transform) lens and are focussed to spots on the sensitive surface of the camera. The effect of the refraction on exiting the sphere is only a slight shift in the position of the focal plane, again correctable by a small movement of the detector (i.e., camera) or lens. However, the spot sizes and positions are not affected. In the case of the cylinder, such a simple correction is not possible. Pixel beams diffracted horizontally (so their axes exit the cylinder surface at normal incidence) behave as in the sphere case, but pixel beams diffracted vertically (with a component along the cylinder axis) have their directions changed as they refract at the surface, causing them to land in the wrong position at the detector, and to have their best focus plane in a different position. This system requires more complex optics to correct aberrations, this is especially apparent as page sizes are increased to maximize capacity. The present invention avoids such complex optics while providing efficient replay of the holographic image data on the surface of the detector (i.e., camera).

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A holographic data storage apparatus, comprising:
    a spherical holographic recording medium;
    addressing means for rotating the recording medium to selectively expose the recording medium to data and reference beams, whereby image data contained in the data beam is recorded in the recording medium at predetermined rotational positions; an
    a container for containing the recording medium therein, the container having at least one optical access window for the data and reference beams to allow entry of the data and reference beams into the container, wherein the container further contains a fluid of optical transparency.

2. The apparatus according to claim 1, wherein the optical access windows are lenses.

3. The apparatus according to claim 1, wherein the fluid is a liquid with a refractive index substantially equal to the refractive index of the recording medium.

4. The apparatus according to claim 1, wherein the recording medium is spherical in only the portions upon which the data and reference beams are incident.

5. The apparatus according to claim 1, wherein the recording medium is lithium niobate.

6. The apparatus according to claim 1, wherein the recording medium is DX-center material.

7. A holographic data retrieval apparatus, comprising:
    a spherical holographic recording medium;
    addressing means for rotating the recording medium to selectively expose the recording medium to a reference beam whereby a data beam containing image data is reconstructed from the recording medium at predetermined rotational positions; and
    a container for containing the recording medium therein, the container having at least one optical access window for the reference and reconstructed data beams to allow entry of the reference beam to the container and exit of the reconstructed data beam from the container, wherein the container further contains a fluid of optical transparency.

8. The apparatus according to claim 7, wherein the optical access windows are lenses.

9. The apparatus according to claim 7, wherein the fluid is a liquid with a refractive index substantially equal to the refractive index of the recording medium.

10. The apparatus according to claim 7, wherein the recording medium is spherical in only the portions upon which the reference beam is incident.

11. The apparatus according to claim 7, wherein the recording medium is lithium niobate.

12. The apparatus according to claim 7, wherein the recording medium is DX-center material.

13. The apparatus according to claim 7, wherein the predetermined rotational positions of the recording medium are also exposed to a phase conjugate copy of the reference beam, whereby a phase conjugate of the data beam is reconstructed from the exposed portion of the recording medium.

14. A holographic data storage and retrieval system, comprising:
    a spherical holographic recording medium;
    a light source;
    addressing means for rotating the recording medium to selectively expose the recording medium to data and/or reference beams at predetermined rotational positions;
    storing means for directing the reference and data beams to be incident upon the predetermined rotational positions of the recording medium when image data contained in the data bean is to be stored in the recording medium;
    data retrieval means for retrieving the stored image data from a reconstructed data beam when the recording medium is exposed to the reference beam; and
    a container for containing the recording medium therein, the container having at least one optical access window for each of the data, reference, and reconstructed reference beams to allow their entry and/or exit to and/or from the container, wherein the container further contains a fluid of optical transparency.

15. The apparatus according to claim 14, wherein the optical access windows are lenses.

16. The apparatus according to claim 14, wherein the fluid is a liquid with a refractive index substantially equal to the refractive index of the recording medium.

17. The apparatus according to claim 14, wherein the recording medium is spherical in only the portions upon which the data and reference beams are incident.

18. The apparatus according to claim 14, wherein the recording medium is lithium niobate.

19. The apparatus according to claim 14, wherein the recording medium is DX-center material.

20. The apparatus according to claim 14, wherein the light source is a laser.

21. The apparatus according to claim 14, wherein the storing means comprises:
    collimating means disposed in the optical path of the light source for collimating the light therefrom;

beam splitting means for transmitting one of the reference or data beams and for reflecting the other from the collimated light;

first reflecting means for reflecting the reference beam towards the recording medium;

second reflecting means for reflecting the data beam towards the recording medium;

data composing means disposed between the second reflecting means and the recording medium for imposing the image data onto the data beam; and a lens for forming one of an image or a Fourier transform of the image data near or within the recording medium where it interferes with the reference beam to form a holographic recording of the image data in the recording medium.

22. The apparatus according to claim 21, wherein the collimating means is a collimating lens.

23. The apparatus according to claim 21, wherein the beam splitting means is a polarization splitting means in which the transmitted beam has a P polarization and the reflected beam has an S polarization, and wherein the apparatus further comprises a ½ waveplate disposed in the optical path of the transmitted beam for rotating its polarization to S polarization before being incident upon the recording medium.

24. The apparatus according to claim 23, wherein the polarization splitting means comprises a polarization beam splitter cube having an interface which transmits the beam of the P polarization and reflects the beam of the S polarization.

25. The apparatus according to claim 21, wherein the first reflecting means is selected from a group consisting of a reflecting prism and mirror.

26. The apparatus according to claim 21, wherein the second reflecting means is selected from a group consisting of a reflecting prism and mirror.

27. The apparatus according to claim 21, wherein the data composing means comprises a spatial light modulator.

28. The apparatus according to claim 14, wherein the data retrieval means comprises:

a lens to reconstruct the reconstructed data beam;

data beam blocking means for blocking the data beam from being incident upon the recording medium when data is to be retrieved from the system; and a camera upon which the reconstructed data beam is imaged thereby forming the image data on a sensitive surface of the camera.

29. The apparatus according to claim 28, wherein the data beam blocking means is a spatial light modulator which blocks the data beam from being incident upon the recording medium when data is be retrieved from the system and which imposes the image data onto the data beam when data is to be stored in the system.

30. The apparatus according to claim 28, wherein the sensitive surface of the camera comprises a pixilated photo sensor array.

31. A holographic data storage apparatus, comprising:

a spherical holographic recording medium;

addressing means for rotating the recording medium to selectively expose the recording medium to data and reference beams, whereby image data contained in the data beam is recorded in the recording medium at predetermined rotational positions; and a container for containing the recording medium therein, the container having at least one optical access window for the data and reference beams to allow entry of the data and reference beams into the container, wherein the container is evacuated so as to maintain the recording medium in a vacuum.

32. A holographic data retrieval apparatus, comprising:

a spherical holographic recording medium;

addressing means for rotating the recording medium to selectively expose the recording medium to a reference beam whereby a data beam containing image data is reconstructed from the recording medium at predetermined rotational positions; and a container for containing the recording medium therein, the container having at least one optical access window for the reference and reconstructed data beams to allow entry of the reference beam to the container and exit of the reconstructed data beam from the container, wherein the container is evacuated so as to maintain the recording medium in a vacuum.

33. A holographic data storage and retrieval system, comprising:

a spherical holographic recording medium;

a light source;

addressing means for rotating the recording medium to selectively expose the recording medium to data and/or reference beams at predetermined rotational positions;

storing means for directing the reference and data beams to be incident upon the predetermined rotational positions of the recording medium when image data contained in the data bear is to be stored in the recording medium;

data retrieval means for retrieving the stored image data from a reconstructed data beam when the recording medium is exposed to the reference beam; and a container for containing the recording medium therein, the container having at least one optical access window for each of the data, reference, and reconstructed reference beams to allow their entry and/or exit to and/or from the container, wherein the container is evacuated so as to maintain the recording medium in a vacuum.

34. A holographic data storage apparatus, comprising:

a spherical holographic recording medium;

addressing means for rotating the recording medium to selectively expose the recording medium to data and reference beams, whereby image data contained in the data beam is recorded in the recording medium at predetermined rotational positions; and a container for containing the recording medium therein, the container having at least one optical access window for the data and reference beams to allow entry of the data and reference beams into the container, wherein the optical access windows are lenses.

35. A holographic data retrieval apparatus, comprising:

a spherical holographic recording medium;

addressing means for rotating the recording medium to selectively expose the recording medium to a reference beam whereby a data beam containing image data is reconstructed from the recording medium at predetermined rotational positions; and a container for containing the recording medium therein, the container having at least one optical access window for the reference and reconstructed data beams to allow entry of the reference beam to the container and exit of the reconstructed data beam from the container, wherein the optical access windows are lenses.

36. A holographic data storage and retrieval system, comprising:

a spherical holographic recording medium;

a light source;

addressing means for rotating the recording medium to selectively expose the recording medium to data and/or reference beams at predetermined rotational positions;

storing means for directing the reference and data beams to be incident upon the predetermined rotational positions of the recording medium when image data contained in the data bear is to be stored in the recording medium;

data retrieval means for retrieving the stored image data from a reconstructed data beam when the recording medium is exposed to the reference beam; and a container for containing the recording medium therein, the container having at least one optical access window for each of the data, reference, and reconstructed reference beams to allow their entry and/or exit to and/or from the container, wherein the optical access windows are lenses.

* * * * *